(12) United States Patent
Foster (10) Patent No.: US 9,476,382 B2
(45) Date of Patent: Oct. 25, 2016

(54) MULTI-LAYERED GASKET

(71) Applicant: Dana Automotive Systems Group, LLC, Maumee, OH (US)

(72) Inventor: Jeffery A. Foster, North Aurora, IL (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 123 days.

(21) Appl. No.: 13/958,696

(22) Filed: Aug. 5, 2013

(65) Prior Publication Data

US 2014/0042705 A1 Feb. 13, 2014

Related U.S. Application Data

(60) Provisional application No. 61/681,740, filed on Aug. 10, 2012.

(51) Int. Cl.
*F02F 11/00* (2006.01)
*F16J 15/08* (2006.01)

(52) U.S. Cl.
CPC .......... *F02F 11/002* (2013.01); *F16J 15/0825* (2013.01); *F16J 2015/085* (2013.01); *F16J 2015/0856* (2013.01); *F16J 2015/0862* (2013.01)

(58) Field of Classification Search
CPC ............. F16J 15/0825; F16J 2015/085; F16J 2015/0856; F16J 2015/0868; F02F 11/002
See application file for complete search history.

(56) References Cited

U.S. PATENT DOCUMENTS

| | | | |
|---|---|---|---|
| 4,140,323 A | 2/1979 | Jacobs | |
| 5,286,039 A * | 2/1994 | Kawaguchi et al. | 277/593 |
| 5,294,135 A * | 3/1994 | Kubouchi et al. | 277/595 |
| 5,431,418 A | 7/1995 | Hagiwara | |
| 5,609,345 A * | 3/1997 | Miura et al. | 277/593 |
| 5,626,348 A * | 5/1997 | Takada et al. | 277/593 |
| 5,690,343 A * | 11/1997 | Takada et al. | 277/595 |
| 5,791,659 A * | 8/1998 | Takada et al. | 277/593 |
| 5,863,046 A * | 1/1999 | Diez et al. | 277/593 |
| 6,105,971 A | 8/2000 | Hasegawa | |
| 6,145,847 A | 11/2000 | Maeda | |
| 6,220,606 B1 * | 4/2001 | Kawaguchi et al. | 277/595 |
| 6,328,314 B1 * | 12/2001 | Jinno et al. | 277/593 |
| 6,349,945 B1 | 2/2002 | Schmucker | |

(Continued)

FOREIGN PATENT DOCUMENTS

| | | |
|---|---|---|
| DE | 20021017 U1 | 3/2001 |
| DE | 10015604 A1 | 10/2001 |

(Continued)

OTHER PUBLICATIONS

International Search Report and Written Opinion—PCT/US2013/053889.

(Continued)

*Primary Examiner* — Kristina Fulton
*Assistant Examiner* — Nicholas L Foster
(74) *Attorney, Agent, or Firm* — Marshall & Melhorn, LLC (57) ABSTRACT

A gasket having a first upper layer, a second lower layer and a spacer layer is provided. The first upper layer has a bead located between two lands. The second lower layer also has a bead located between two lands. The spacer layer has an embossment located between two lands. A coating may be located within the embossment. The beads are located in an axial relationship with respect to the embossment.

18 Claims, 9 Drawing Sheets

(56) References Cited

U.S. PATENT DOCUMENTS

| | | |
|---|---|---|
| 6,354,599 B1 | 3/2002 | Inamura |
| 6,527,277 B2 | 3/2003 | Hegmann |
| 6,565,097 B2 | 5/2003 | Jinno |
| 6,644,669 B2 | 11/2003 | Unseld |
| 6,708,982 B2 | 3/2004 | Zerfass et al. |
| 6,712,364 B2 | 3/2004 | Unseld |
| 6,746,021 B2 | 6/2004 | Breen |
| 6,827,352 B2 | 12/2004 | Ueta |
| 6,957,815 B1 | 10/2005 | Inciong |
| 7,234,705 B2 | 6/2007 | Novil et al. |
| 7,374,177 B2 | 5/2008 | Tripathy |
| 7,913,386 B2 | 3/2011 | Werz |
| 7,997,585 B2 * | 8/2011 | Werz et al. ............... 277/593 |
| 8,246,054 B2 | 8/2012 | Schmitt |
| 2002/0079651 A1 * | 6/2002 | Unseld et al. ............ 277/592 |
| 2003/0151210 A1 * | 8/2003 | Ueta et al. ............... 277/595 |
| 2003/0151211 A1 * | 8/2003 | Chen et al. ............... 277/595 |
| 2004/0012154 A1 * | 1/2004 | Unseld ............... F16J 15/0825 277/593 |
| 2004/0012155 A1 * | 1/2004 | Diez ............... 277/593 |
| 2006/0232017 A1 | 10/2006 | Hamada et al. |
| 2012/0126491 A1 | 5/2012 | Schmitt |
| 2012/0175847 A1 * | 7/2012 | Popielas et al. ............ 277/592 |

FOREIGN PATENT DOCUMENTS

| | | |
|---|---|---|
| EP | 0 982 517 A1 | 3/2003 |
| JP | 20002335 A | 1/2000 |
| JP | 3314371 B2 | 6/2002 |
| JP | 2003322256 A | 11/2003 |
| WO | 02/36996 A1 | 5/2002 |
| WO | 2009/130044 A1 | 10/2009 |

OTHER PUBLICATIONS

English Abstract of JP20002335.
English Abstract of JP2003322256.
English Abstract of JP3314371.

* cited by examiner

MULTI-LAYERED GASKET

RELATED APPLICATION

This application claims the benefit under 35 U.S.C. §119 (e) of U.S. Provisional Patent Application Ser. No. 61/681,718, filed Aug. 10, 2012 and Provisional Patent Application Ser. No. 61/681,740, filed Aug. 10, 2012, which are incorporated by reference herein in their entirety.

FIELD OF THE INVENTION

The present invention relates to a multi-layered gasket, such as used between a cylinder head and a cylinder block in an internal combustion engine.

BACKGROUND OF THE INVENTION

Gaskets are often used as a seal between mating mechanical components. One common application involves gasket placement between the engine block and the cylinder head of an internal combustion engine. Cylinder head gaskets typically extend around the cylinder bores to provide a combustion seal, maintaining the high temperature gases of combustion within the cylinder bores. At the same time, the gaskets also seal fluid flow openings such as coolant and oil openings to prevent undesirable mixing. In addition, such gaskets prevent leakage by sealing the areas around the bolts which connect the cylinder head and engine block. The gasket bears the load from a bolted connection of the mechanical components and relies upon that load to provide a seal.

Gaskets can be made of a wide variety of materials and layers. Typically, cylinder head gaskets are constructed of at least two metal layers. An additional layer, or layers, which is known as a shim, may be located between the two metal layers, which are often referred to as the active gasket layers.

A shim is typically made of metal and may have a constant thickness. Shims typically are not compressible and thus may assist in creating a sealing feature for the gasket when the gasket is compressed.

Shims, however, do have some significant disadvantages. More particularly, when the gasket is compressed, the loading of the shim between the cylinder bores is typically poor. If the shim is not properly loaded, it may result in premature failure or overall poor performance of the gasket.

Furthermore, shims require extra metal material, thus increasing not only materials costs for the gasket, but also they also increase manufacturing costs. Shims also disadvantageously require mechanical locking features to secure them to another layer of the gasket. These locking features increase the cost of the gaskets and are subject to failure. Lastly, it is difficult to accurately adjust the thickness of a shim in a cost effective manner where variable shim thickness is preferred to tailor gasket loading.

What is sought is added sealing between the two outer metallic layers, without providing a shim layer, as a result reduced material and labor costs would be realized.

SUMMARY OF THE INVENTION

In one embodiment, the present invention is directed toward a multi-layer gasket having a first layer, a second layer and a spacer layer located between the two layers. The first layer may have a bead axially located between two lands. The bead and lands are unitary with the first layer. The second layer may have a bead axially located between two lands. The beads and the lands are unitary with the second lower layer. The spacer layer has an embossment located between two lands. The embossment and the lands are unitary with the spacer layer. A channel is formed on a surface of the spacer layer within the embossment. The channel may contain a coating.

BRIEF DESCRIPTION OF THE DRAWINGS

The above, as well as other advantages of the present invention, will become readily apparent to those skilled in the art from the following detailed description when considered in the light of the accompanying drawings in which.

DETAILED DESCRIPTION OF THE INVENTION

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 1:
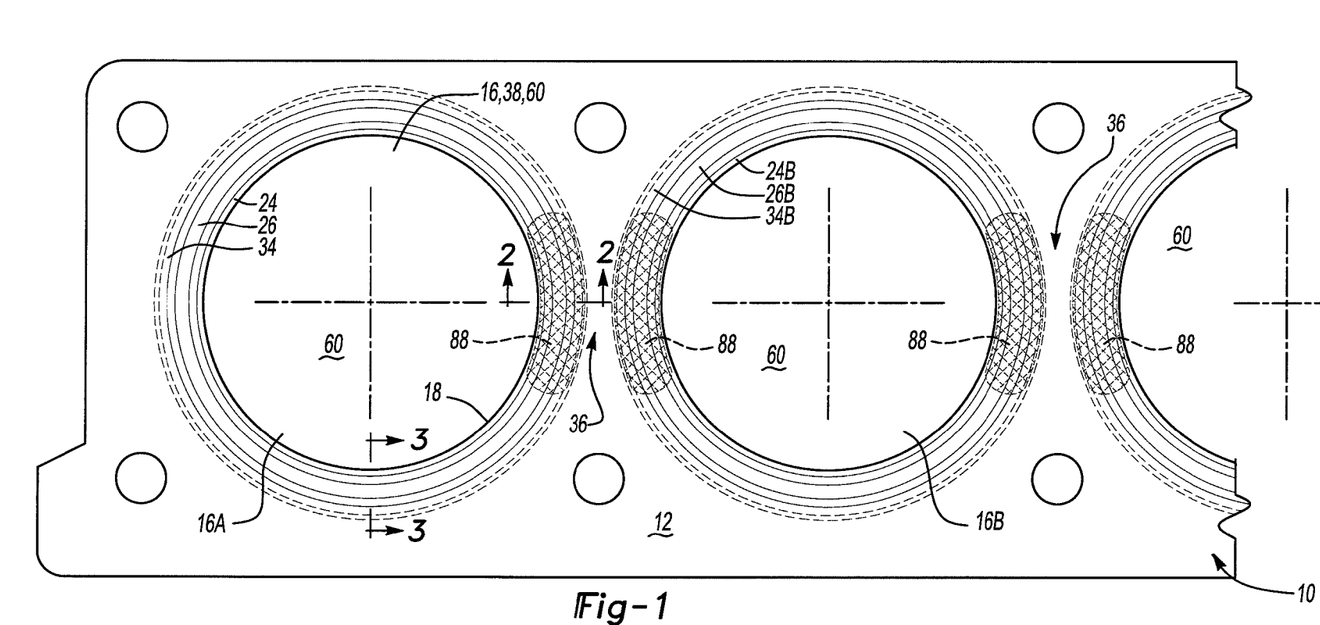
FIG. 1 is a partial plan view of one embodiment of a gasket of the present invention.
Figure 2:
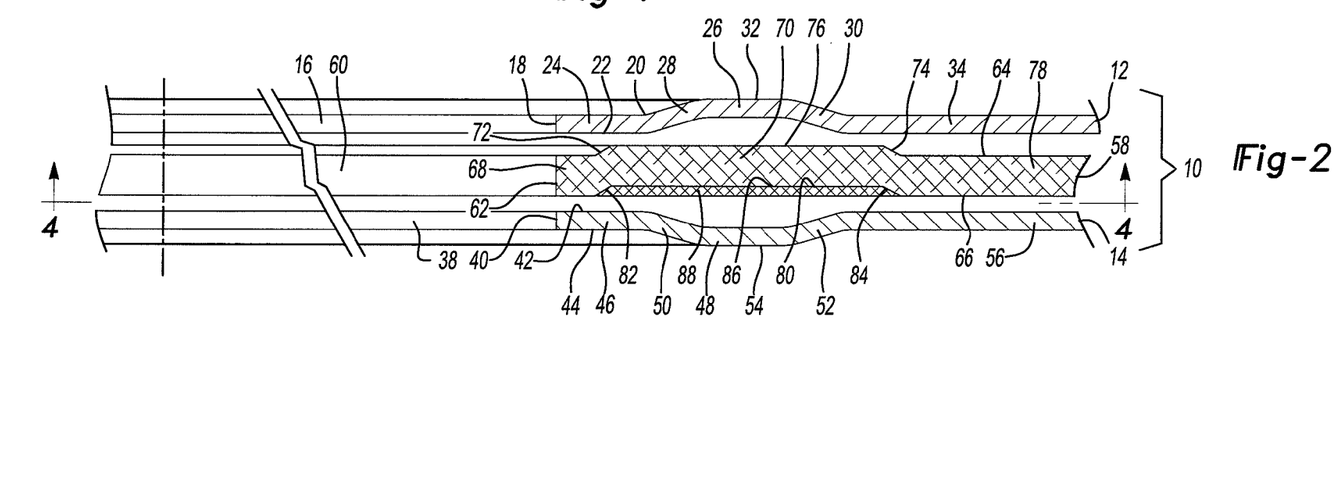
FIG. 2 is cross-section side view along lines 2-2 of FIG. 1.

Turning now to FIGS. 1 and 2, one embodiment of a gasket 10 of the present invention is depicted. The gasket 10 may be such as a cylinder head gasket, but it may be used for other purposes as well.

The gasket 10 is provided with a first metallic layer 12 and a second metallic layer 14, although additional layers are permissible. The first metallic layer 12 has at least one combustion opening 16 located therein. Preferably, each opening 16 extends entirely through the layer 12. Each opening 16 is circumscribed by a combustion opening edge 18 of the first layer 12.

An upper surface 20 and a lower surface 22 extend axially outward from the combustion opening edge 18. The surfaces 20, 22 remain substantially parallel to one another even with the various physical features of the layer 12 as described below. The parallel nature of the surfaces 20, 22 results in a layer 12 with substantially constant thickness.

The upper and lower surfaces 20, 22 define between them a one-piece, integrally formed, unitary first land 24. The first land 24 is located directly axially outward from the combustion opening edge 18. The upper and lower surfaces 22, 24 in the area of the first land 24 are substantially planar.

A first active bead 26 is one-piece, integrally formed and unitary with the first land 24. The first active bead 26 may have a first ramp 28, a second ramp 30 and a planar portion 32 located between the two ramps 28, 30. The planar portion 32 is substantially parallel with the first land 24 and a second land 34, described below.

In another embodiment, not shown, the first active bead 26 may have the same location within the first layer 12 and have the same overall shape, but it may have curvilinear transitions between the ramps 28, 30 and the planar portion 32. It is also permissible for the planar portion 32 to be curvilinear.

The first active bead 26 is one-piece, integrally formed and unitary with a second land 34. The upper and lower surfaces 20, 22 of the second land 34 are substantially parallel with one another, as well as with the upper and lower surfaces 20, 22 of the first land 24. The second land 34 continues in the axial direction and forms a land area 36 located between two adjacent combustion openings 16.

More particularly, in one embodiment, the combustion opening edge 18 defines one combustion opening 16A that the first land 24, first bead 26 and second land 34 extend axially from, respectively. Another combustion opening 16B is located adjacent the above-described opening 16A and another such arrangement, as first land 24B, bead 26B and second land 34B, may be provided about that opening 16B as well. The area between the combustion openings 16A, 16B may be referred to as the land area 36.

The second metallic layer 14 also has at least one combustion opening 38 located therein that correspond with the openings 16 of the first layer 12. Preferably, each opening 38 extends entirely through the layer 14. Each opening 38 is circumscribed by a combustion opening edge 40 of the second layer 14.

An upper surface 42 and a lower surface 44 extend axially outward from the combustion opening edge 40. The surfaces 42, 44 remain substantially parallel to one another even with the various physical features of the layer 14 as described below. The parallel nature of the surfaces 42, 44 results in a layer 14 with substantially constant thickness.

The upper and lower surfaces 42, 44 define between them a one-piece, integrally formed, unitary first land 46. The first land 46 is located directly axially outward from the combustion opening edge 40. The upper and lower surfaces 42, 44 in the area of the first land 46 are substantially parallel.

A first active bead 48 is one-piece, integrally formed and unitary with the first land 46. The first active bead 48 may have a first ramp 50, a second ramp 52 and a planar portion 54 located between the two ramps 50, 52. The planar portion 54 is substantially parallel with the first land 46 and a second land, described below.

In another embodiment, not shown, the first active bead 48 may have the same location within the second layer 14 and have the same overall shape, but it may have curvilinear transitions between the ramps 50, 52 and the planar portion 54. It is also permissible for the planar portion 54 to be curvilinear.

The first active bead 48 is one-piece, integrally formed and unitary with a second land 56. The upper and lower surfaces 42, 44 of the second land 56 are substantially parallel with one another, as well as with the upper and lower surfaces 42, 44 of the first land 46. The second land 56 continues in the axial direction and may form the land area 36 located between two adjacent combustion openings 38, as described above.

More particularly, in one embodiment, the combustion opening edge 40 defines one combustion opening 38 that the first land 46, first bead 48 and second land 56 extend axially from, respectively. Another combustion opening (not shown) is located adjacent the above-described opening 38 and another such arrangement, as first land, bead and second land (not shown), may be provided about that opening as well. The area between the combustion openings may be referred to as the land area 36.

A spacer layer 58 is located between the first and second layers 12, 14. The spacer layer 58 also has at least one combustion opening 60 located therein. The spacer layer combustion openings 60 correspond to the openings 16, 38 in the first and second layers 12, 14. Each opening 60 in the spacer layer 58 is circumscribed by a combustion opening edge 62.

An upper surface 64 and a lower surface 66 extend axially outward from the combustion opening edge 62 of the spacer layer 58. The surfaces 64, 66 remain substantially parallel to one another even with the various physical features of the layer 58 as described below. The parallel nature of the surfaces 64, 66 results in a spacer layer 58 with a substantially constant thickness.

The upper and lower surfaces 64, 66 define between them a one-piece, integrally formed, unitary first land 68. The first land 68 is located directly axially outward from the combustion opening edge 62. The upper and lower surfaces 64, 66 in the area of the first land 68 are substantially parallel.

An embossment 70 is one-piece, integrally formed and unitary with the first land 68. The embossment 70 may have a first ramp 72, a second ramp 74 and a planar portion 76 located between the two ramps 72, 74. The planar portion 76 is substantially parallel with the first land 68 and a second land, described below. The second land 78 continues in the axial direction and may form land area 36.

More particularly, in one embodiment, the combustion opening edge 62 defines one combustion opening 60 that the first land 68, embossment 70 and second land 78 extend axially from, respectively. Another combustion opening (not shown) is located adjacent the above-described opening 60 and another such arrangement, as first land, embossment and second land, may be provided about that opening as well. The area between the combustion openings may be referred to as the land area 36.

In another embodiment (not shown), the embossment 70 may have the same location within the spacer layer 58 and have the same overall shape, but it may have curvilinear transitions between the ramps 72, 74 and the planar portion 76. It is also permissible for the planar portion 76 to be curvilinear.

The embossment 70 is one-piece, integrally formed and unitary with a second land 78. The upper and lower surfaces 64, 66 of the second land 78 are substantially planar with one another, as well as with the upper and lower surfaces 64, 66 of the first land 68.

A channel 80 is formed in the embossment 70 in the lower surface 66 of the spacer layer 58. Preferably, the channel 80 extends continuously circumferentially about the combustion opening 60. It is also preferred that the above-described other features of the spacer layer 58, as well as the above-described features of the other layers, also extend continuously circumferentially about the combustion opening 60.

The channel 80 is provided with a first ramp 82, a second ramp 84 and a planar portion 86 between the two ramps 82, 84. The first ramp 82 of the channel 80 and the first ramp 72 of the embossment 70 are axially aligned, the second ramp 84 of the channel 80 and the second ramp 74 of the embossment 70 are axially aligned and the planar portions 76, 86 of the embossment 70 and the channel 80 are axially aligned with one another.

Further, it is preferred that the first layer first land 24, the second layer first land 46, the first layer first ramp 28 and the second layer first ramp 50, the first layer planar portion 32 and the second layer planar portion 54 and the first layer second ramp 30 and the second layer second ramp 52 are axially aligned with one another, respectively.

It is also preferred that the embossment 70 and channel 80 extend axially outboard of both of the first layer first active bead 26 and the second layer first active bead 48. More particularly, the first ramps 72, 82 of the channel 80 and the embossment 70 are located axially outboard of the first ramps 28, 50 of the first and second layers 12, 14 and the second ramps 74, 84 of the channel 80 and the embossment 70 are located axially outboard of the second ramps 30, 52 of the first and second layers 12, 14.

Figure 4:
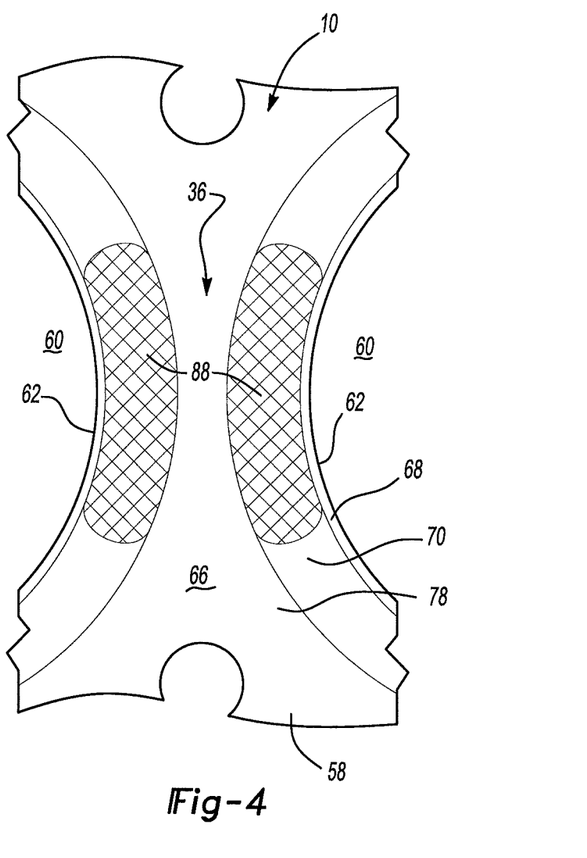
FIG. 4 is a partial plan view along line 4-4 of FIG. 2.

As depicted in FIGS. 1, 2 and 4, a coating 88 is selectively located within the channel 80. The coating 88, for example, epoxy (e.g., H11) with or without copper disposed therein, may have a constant thickness about the combustion opening 60, or the thickness of the coating 88, may vary about the combustion opening 60, which can include no coating. Further, the coating 88 may be substantially constant in its thickness radially from the combustion opening 60 or the thickness may vary radially from the opening 60.

In FIG. 2, the thickness, or topography, of the coating 88 in the channel 80 is substantially constant and planar. The coating 88 extends continuously along the channel 80 from the first channel ramp 82 to the second channel ramp 84. More particularly, the coating 88 is in contact with both the first ramp 82 and the second ramp 84. The first ramp 82 and second ramp 84 create a dam that prevents the coating 88 from moving axially beyond either.

Figure 3:
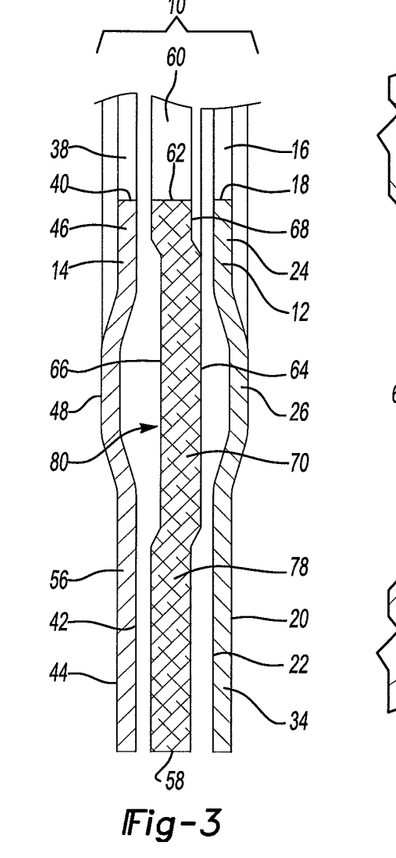
FIG. 3 is a cross-section side view along lines 3-3 of FIG. 1.

The thickness of the coating 88, however, outside of the land area 36 between the combustion openings 60 may be reduced, or entirely foregone as shown in FIG. 3, or it may only extend partially from the channel first ramp 82 to the channel second ramp 84, or vice versa. The topography of the coating 88 may be tailored to the conditions the gasket 10 will be exposed to.

The thickness, or even presence, of the coating 88 is determined by the geometry and features of each individual gasket 10. It has been found areas of the gasket 10 adjacent to mechanical fasteners are highly compressed and may not require additional compression for the gasket 10 to maintain a proper seal. Such fasteners are not typically located between the combustion openings but compression of the gasket 10, and any sealing beads, is very important in these areas to maintain a proper seal. This is particularly true due to the increased pressure and forces experienced by the gasket 10 adjacent the combustion openings.

The coating 88 may be such as rubber, or a synthetic rubber material, adapted for the cyclic high temperature and high pressure environment of a cylinder head gasket. The coating 88 may also be such as a bronze powder encapsulated within an epoxy material. Other materials robust enough to survive for prolong periods of time adjacent a combustion opening for an internal combustion engine may also be used.

Regardless of the material selected, it is preferred that it be relatively hard and relatively incompressible. An incompressible material will not change, or will not substantially change, its thickness under the above-described conditions or when it is located between a cylinder head and a cylinder block of an internal combustion engine. The thickness of the material also will not change, or appreciably change, when it is located between the block and the head under compression and when it encounters upstanding features or depressions in either. In short, the coating 88 of the present invention provides the spacer layer 58 with robustness or incompressibility upon which the active layers 12, 14, or more preferably their beads 26, 48, may compress against to provide excellent sealing.

Figure 6:
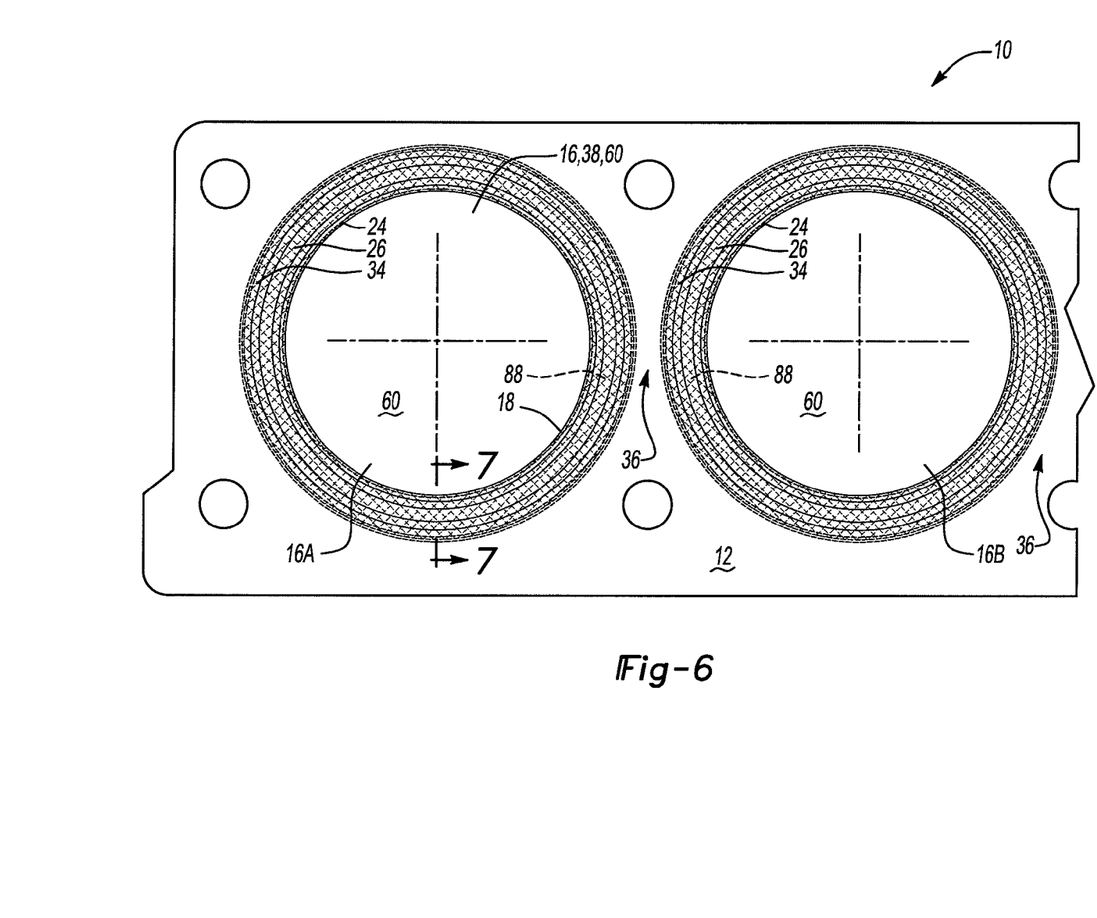
FIG. 6 is a partial plan view of another embodiment.
Figure 7:
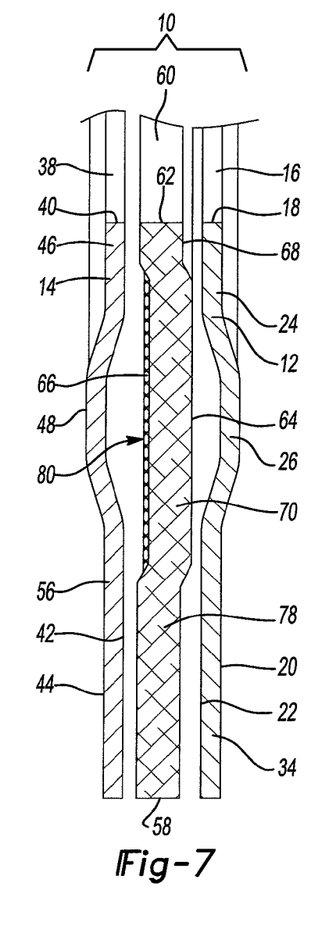
FIG. 7 is a cross-section side view along lines 7-7 of FIG. 6.

FIGS. 6 and 7 depict yet another embodiment of the present invention where the coating 88 extends around the combustion opening 60. The coating 88 may be substantially constant in its thickness radially from the opening 60 or the thickness may vary radially from the opening 60. This includes the coating varying radially from some predetermined thickness to no coating at all.

In the land area 36, the coating 88 may have a substantially constant thickness from the first channel ramp 82 to the second channel ramp 84. FIG. 7 depicts an area away from the land area 36 where the thickness of the coating 88 has been reduced. The coating 88 still has a substantially constant thickness radially outward from the opening 60 in FIG. 7, but it may be varied.

Figure 8:
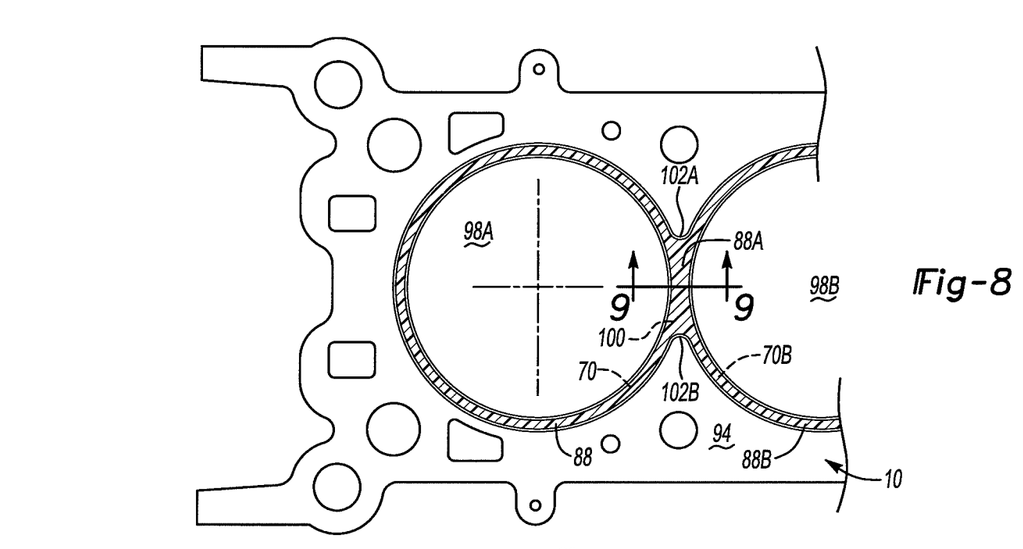
FIG. 8 is a partial plan view of an intermediate layer depicting another embodiment.
Figure 9:
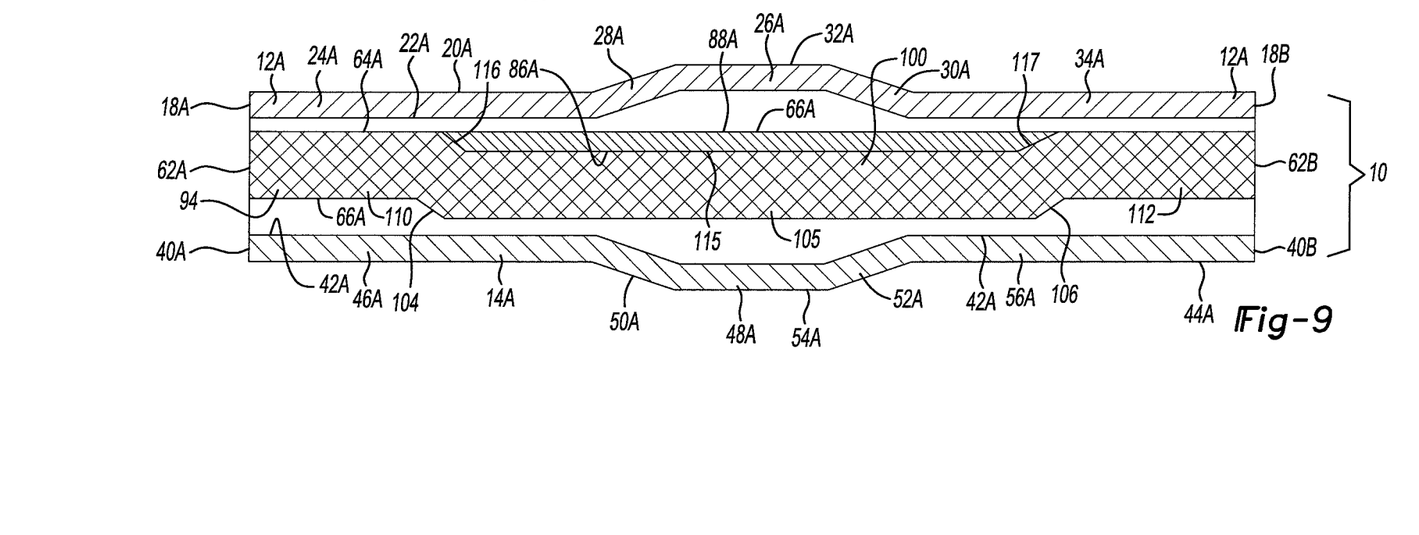
FIG. 9 is a cross-section view along lines 9-9 of FIG. 8.
Figure 12:
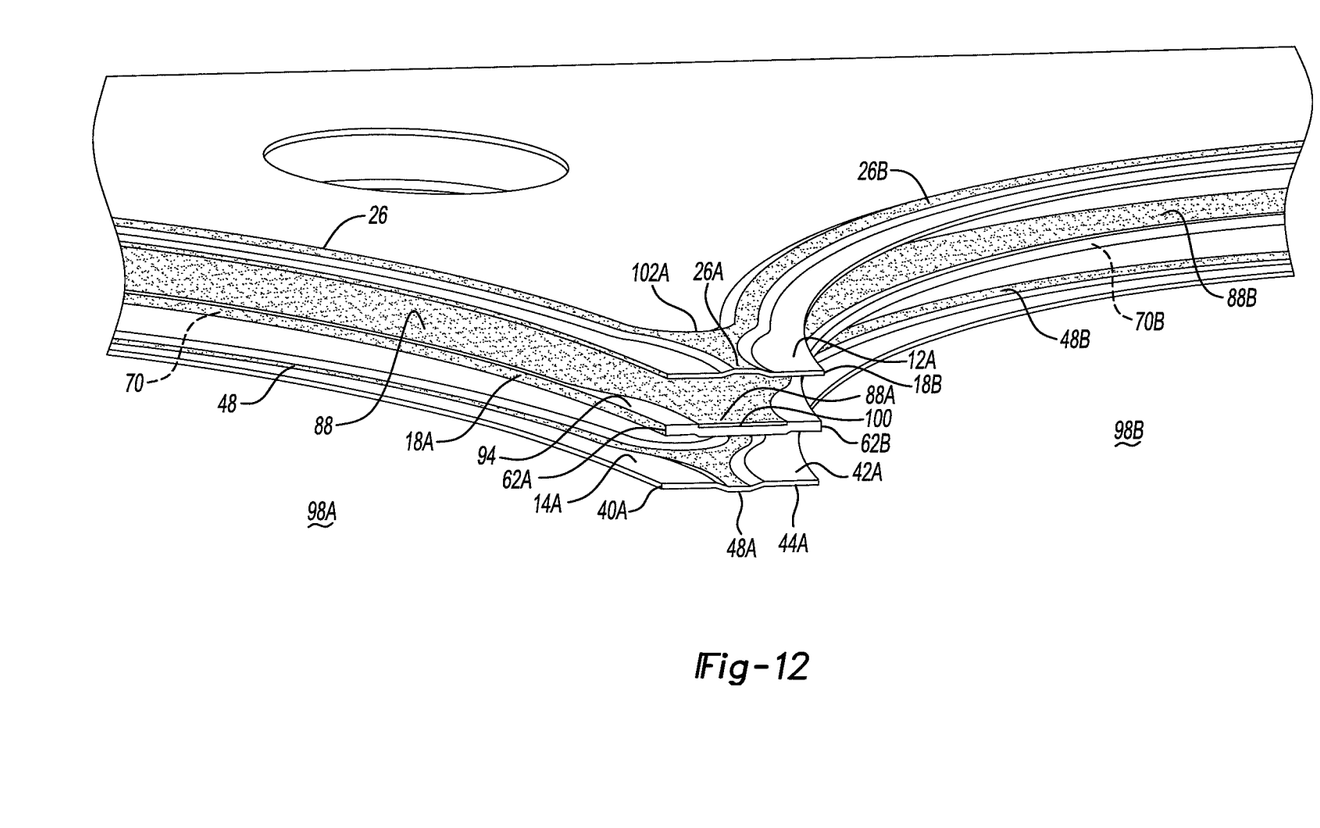
FIG. 12 is an exploded perspective cross-section view along lines 9-9 of FIG. 8.

FIGS. 8, 9, and 12 depict another embodiment, which has two metallic layers 12A, 14A, and an intermediate spacer layer 94. In this embodiment, the land area 36 depicted and described above in the previous embodiments is eliminated. As indicated in FIG. 12, two embossments 70, 70B (both hidden) in the intermediate spacer layer 94, and four beads 26, 26B, 48, 48B in their corresponding metallic layers 12, 14 extend around most of their corresponding combustion openings 98A, 98B, and then merge into a single embossment 100 or single corresponding beads 26A, 48A, in the area between the two openings 98A, 98B.

As further shown in FIGS. 8 and 12, the two embossments 70, 70B, which are covered by respective coatings 88, 88B, come together between merge points 102A, 102B and thereby become the single embossment 100 covered by a coating 88A. While only one example of the merge points 102A, 102B of the two embossments 70, 70B is depicted, it is within the scope of the present invention to locate the merge points 102A, 102B deeper between the two openings 98A, 98B or to have the merge points 102A, 102B occur more in a back land area of the gasket 10.

The area of the spacer layer 94 between the openings 98A, 98B has the features of the spacer layer 58 described and depicted above. For example, as shown in FIG. 9, the spacer layer 94 has a first ramp 104 and a second ramp 106, and a planar portion 105 between the ramps 104, 106. The ramps 104, 106 are unitary with first and second lands 110, 112, respectively. A channel 115, banded by ramps 116, 117, is located in the embossment 100. The coating 88A, which may be located in the channel 115, is similarly described as detailed above for coating 88.

Although this embodiment of the gasket 10 is depicted with a first metallic layer 12A and a second metallic layer 14A, additional metallic layers are permissible, which is possible for all embodiments described herein.

In the area between combustion openings 98A, 98B, the first metallic layer 12A has an upper surface 20A and a lower surface 22A extending axially outward from the combustion opening edge 18A at the combustion opening 98A. The surfaces 20A, 22A remain substantially parallel to one another even with the various physical features of the layer 12A as described below. The parallel nature of the surfaces 20A, 22A results in a layer 12A with substantially constant thickness.

The upper and lower surfaces 20A, 22A define between them a one-piece, integrally formed, unitary first land 24A. The first land 24A is located directly axially outward from the combustion opening edge 18A. The upper and lower surfaces 22A, 24A in the area of the first land 24A are substantially planar.

The first active bead 26A is one-piece, integrally formed and unitary with the first land 24A. The first active bead 26A may have a first ramp 28A, a second ramp 30A and a planar portion 32A located between the two ramps 28A, 30A. The planar portion 32A is substantially parallel with the first land 24A and a second land 34A.

The first active bead 26A is one-piece, integrally formed and unitary with the second land 34A. The upper and lower surfaces 20A, 22A of the second land 34A are substantially parallel with one another, as well as with the upper and lower surfaces 20A, 22A of the first land 24A. The second land 34A continues in the axial direction toward the second combustion opening edge 18B, which is at the opening 98B. The upper and lower surfaces 20A, 22A in the area of the second land 34A are substantially planar.

In another embodiment, not shown, the first active bead 26A may have the same location within the first layer 12A and have the same overall shape, but it may have curvilinear transitions between the ramps 28A, 30A and the planar portion 32A. It is also permissible for the planar portion 32A to be curvilinear.

As mentioned above, the spacer layer 94 is located between the first and second layers 12A, 14A. The spacer layer 94 has an edge 62A that extends axially outward from the combustion opening 98A, which is circumscribed by the edge 62A.

An upper surface 64A and a lower surface 66A extend axially outward from the combustion opening edge 62A of the spacer layer 94. The surfaces 64A, 66A remain substantially parallel to one another even with the various physical features of the layer 94 as described below. The parallel nature of the surfaces 64A, 66A results in the spacer layer 94 having a substantially constant thickness.

The upper and lower surfaces 64A, 66A define between them the one-piece, integrally formed, unitary first land 110. The first land 110 is located directly axially outward from the combustion opening edge 62A. The upper and lower surfaces 64A, 66A in the area of the first land 110 are substantially parallel.

The planar portion 105 is substantially parallel with the first land 110 and the second land 112, as described above. The second land 112 continues in the axial direction toward the second combustion opening edge 62B, which is at the opening 98B.

In another embodiment, not shown, the embossment 100 may have the same location within the spacer layer 94 and have the same overall shape, but it may have curvilinear transitions between the ramps 116, 117 and the planar portion 105. It is also permissible for the planar portion 105 to be curvilinear.

Further, in the area between combustion openings 98A, 98B, the second metallic layer 14A has an upper surface 42A and a lower surface 44A extending axially outward from the combustion opening edge 40A at the combustion opening 98A, which is further circumscribed by the combustion opening edge 40A.

Surfaces 42A, 44A remain substantially parallel to one another even with the various physical features of the layer 14A as described below. The parallel nature of the surfaces 42A, 44A results in the layer 14A with substantially constant thickness and extending axially outward to the combustion opening edge 40B at the combustion opening 98B, which is further circumscribed by a combustion opening edge 40B.

The upper and lower surfaces 42A, 44A define between them the one-piece, integrally formed, unitary first land 46A. The first land 46A is located directly axially outward from the combustion opening edge 40A. The upper and lower surfaces 42A, 44A in the area of the first land 46A are substantially parallel.

The second active bead 48A is one-piece, integrally formed and unitary with the first land 46A. The first active bead 48A may have a first ramp 50A, a second ramp 52A and a planar portion 54A located between the two ramps 50A, 52A. The planar portion 54A is substantially parallel with the first land 46A and a second land 56A.

In another embodiment, not shown, the second active bead 48A may have the same location within the second layer 14A and have the same overall shape, but it may have curvilinear transitions between the ramps 50A, 52A and the planar portion 54A. It is also permissible for the planar portion 54A to be curvilinear.

Figure 10:
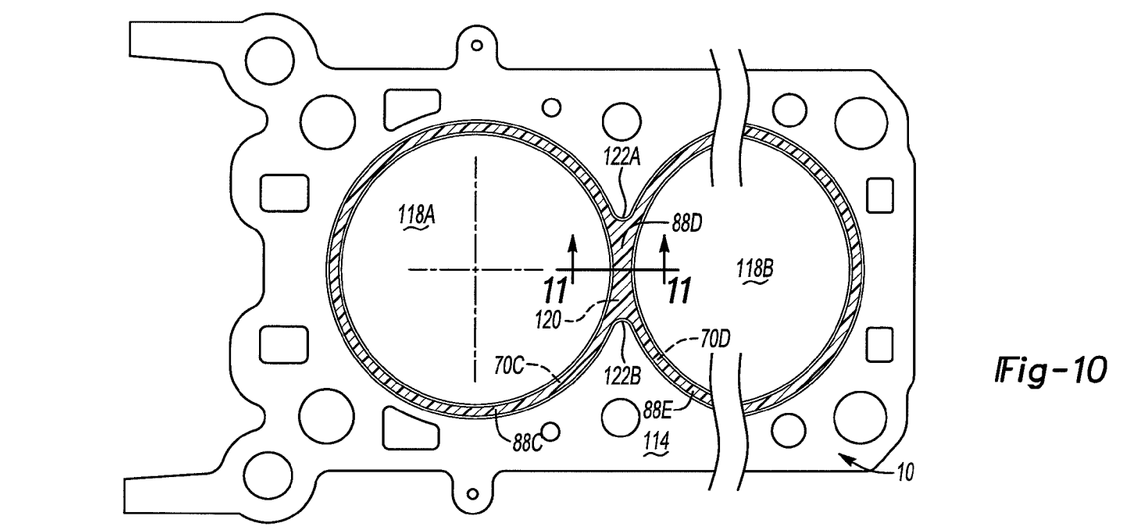
FIG. 10 is a partial plan view of another intermediate layer depicting another embodiment.
Figure 11:
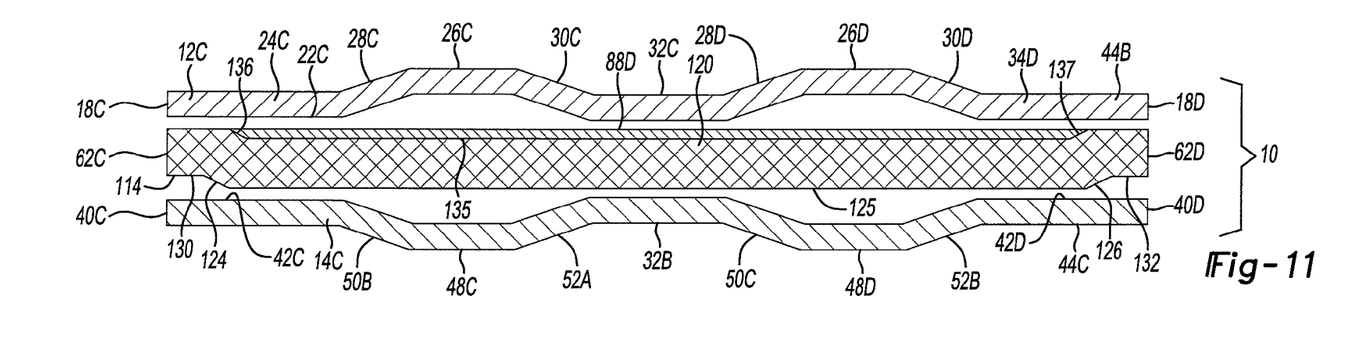
FIG. 11 is a cross-section view along lines 11-11 of FIG. 10.
Figure 13:
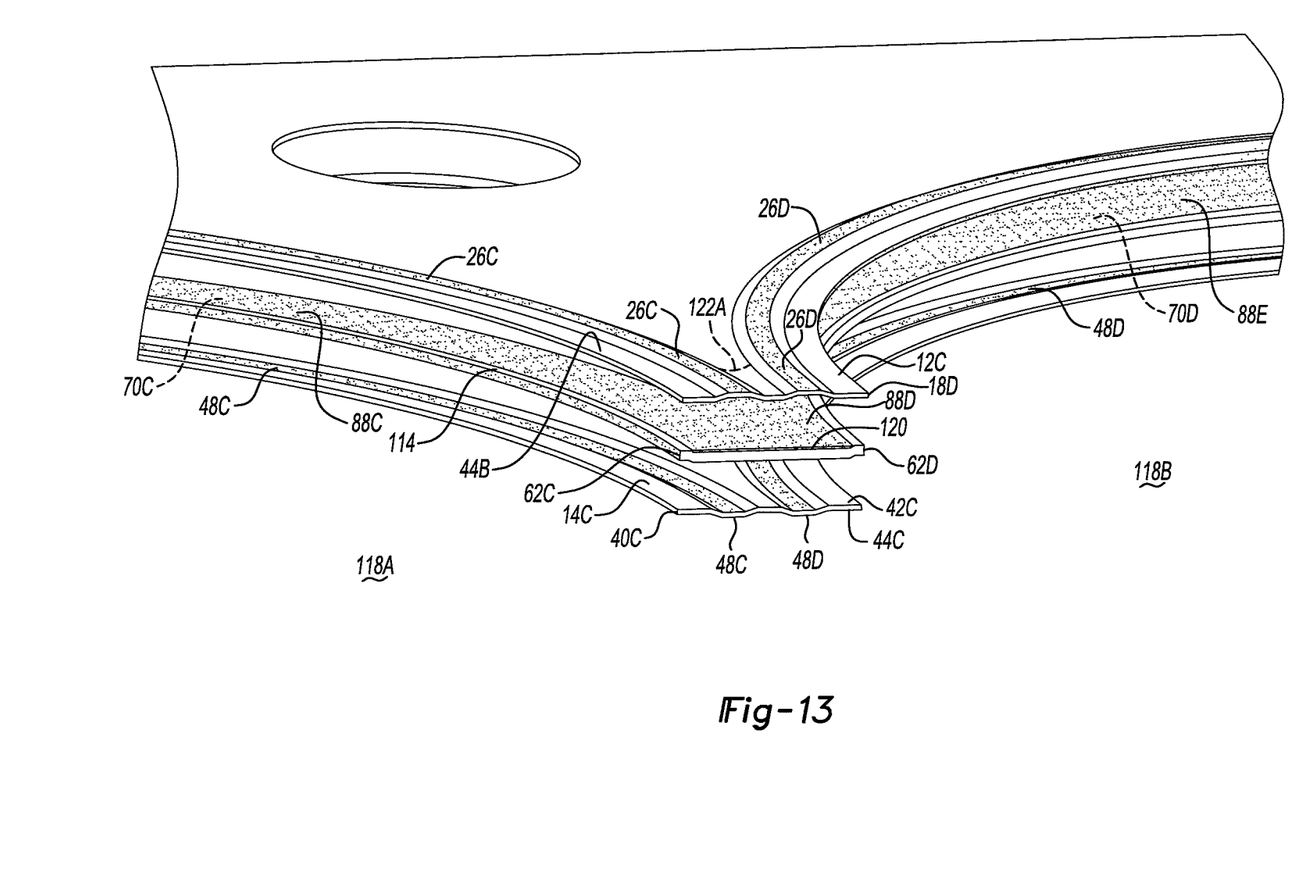
FIG. 13 is an exploded perspective cross-section view along lines 11-11 of FIG. 10.

FIGS. 10, 11, and 13 depict another embodiment of an intermediate spacer layer 114. In this embodiment, again the land area 36 depicted and described above in the previous embodiment is eliminated. As shown in FIG. 13, two embossments 70C, 70D, in the intermediate spacer layer 114, extend around respective combustion openings 118A, 118B and then merge into a single embossment 120 in the area between the two openings 118A, 118B. As further shown in FIGS. 10 and 13, the two embossments 70C, 70D, which are shown in FIG. 10 being covered by respective coatings 88C, 88E, come together between merge points 122A, 122B and thereby become the single embossment 120 covered by a coating 88D.

While one example of the merge points 122A, 122B of the two embossments 70C, 70D is depicted, it is within the scope of the present invention to locate the merge points 122A, 122B deeper between the two openings 118A, 118B or to have the merge points 122A, 122B occur more in a back land area of the gasket 10.

The area of the spacer layer 114 that is between the openings 118A, 118B has the features of the spacer layer 58 described and depicted above. For example, the spacer layer 114 has a first ramp 124 and a second ramp 126 and a planar portion 125 between the ramps 124, 126. The ramps 124, 126 are unitary with first and second lands 130, 132, respectively. A channel 135, which covers most of the area between the 62C and 62D edges, is banded by ramps 136, 137 and located in the embossment 120. The coating 88D, which may be located in the channel 135, is similarly structured as detailed above for the coating 88 (see FIG. 11).

Unlike the embodiment illustrated in FIG. 12, however, the embodiment shown in FIG. 13 has two upper beads 26C, 26D and two lower beads 48C, 48D that remain separated from each other in the corresponding metallic layers 12C, 14C, even in the area of the intermediate spacer layer 114 between the two combustion openings 118A, 118B. Also, in this embodiment, the channel 135 covers more of the area between the edges 62C, 62D than the channel 115 covers the area between the edges 62A, 62B (see FIG. 11).

In another embodiment (not shown), likewise the two upper active beads 26C, 26D may have the same location within the first layer 12C and have the same overall shape, but they may have curvilinear transitions respectively between the ramps 28C, 30C and 28D, 30D and the planar portions of the beads 26C, 26D. It is also permissible for the planar portions of the beads 26C, 26D to be curvilinear.

In another embodiment (not shown), the two lower active beads 48C, 48D may have the same location within the second layer 14C and have the same overall shape, but they may have curvilinear transitions respectively between the ramps 50B, 52A and 50C, 52B and the planar portions of the beads 48B, 48C. It is also permissible for the planar portions of the beads 48C, 48D to be curvilinear.

Figure 14:
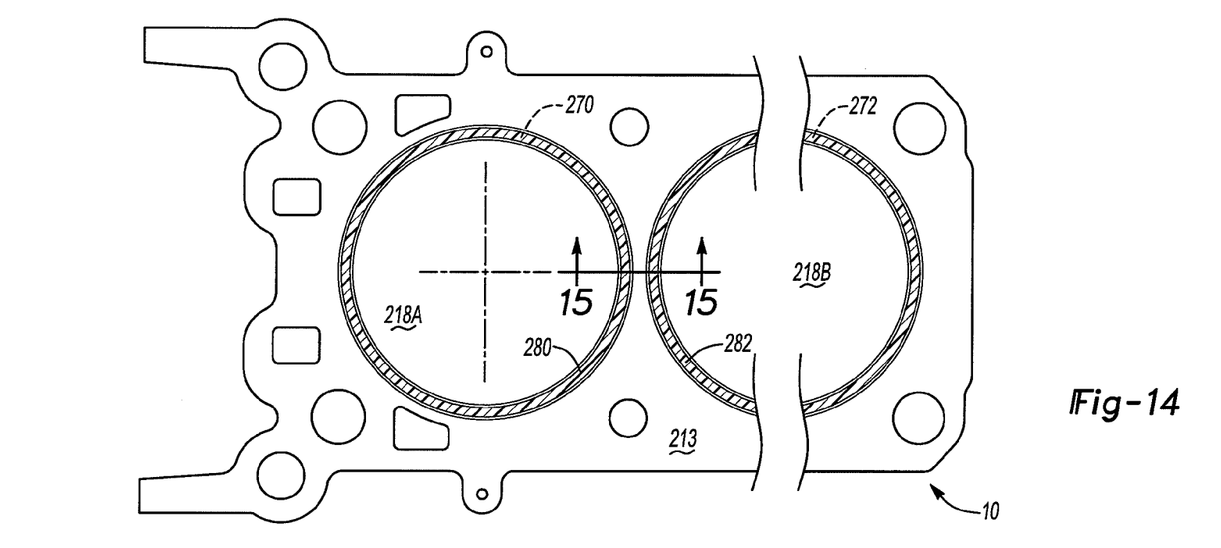
FIG. 14 is a partial plan view of another intermediate layer depicting another embodiment.
Figure 15:
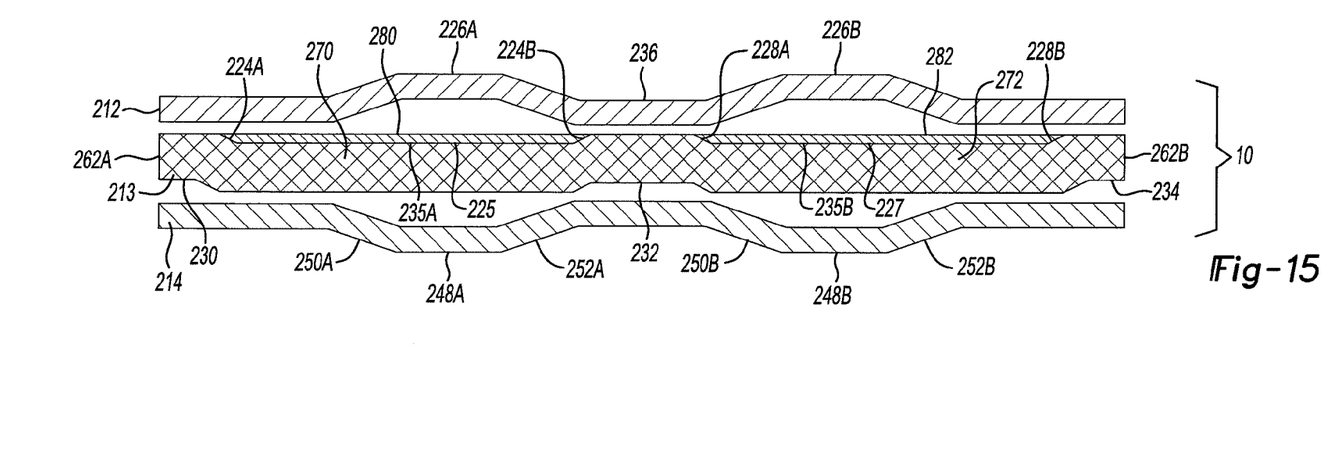
FIG. 15 is a cross-section view along lines 15-15 of FIG. 14.
Figure 16:
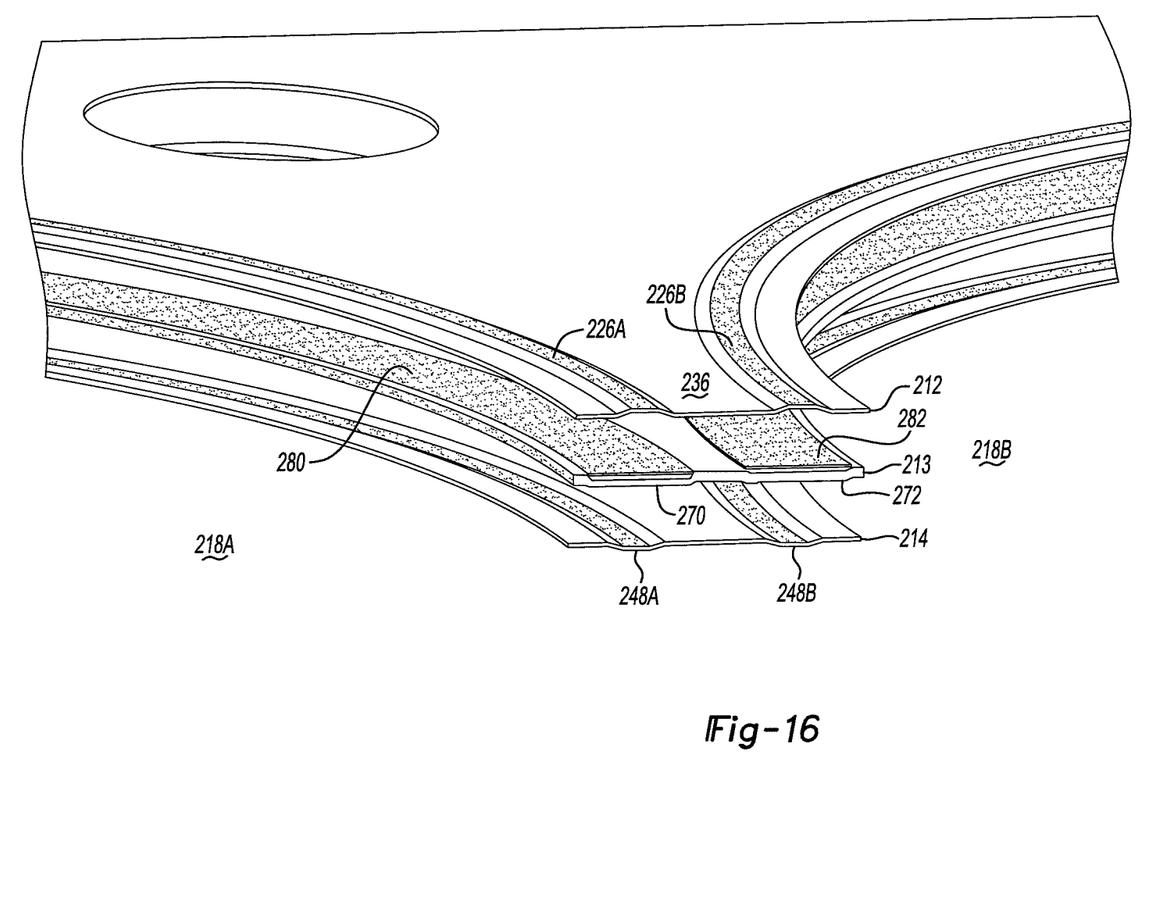
FIG. 16 is an exploded perspective cross-section view along lines 15-15 of FIG. 14.

FIGS. 14, 15, and 16 depict another embodiment of an intermediate spacer layer 213. In this embodiment, there is a land area 236 depicted (see FIG. 16) of a first metallic layer 212 which is similar to the land area 36 described above. As further shown in FIG. 16, two embossments 270, 272, in the intermediate spacer layer 213, extend around respective combustion openings 218A, 218B. Here, however, the embossments 270, 272 remain separated in the land area 236 between the two openings 218A, 218B. As shown in FIGS. 15 and 16, the two embossments 270, 272, which may be covered by respective coatings 280, 282, are further shown separated below the land area 236, between the openings 218A, 218B.

In the spacer layer 213 between the openings 218A, 218B there are four ramps 224A, 224B, 228A, 228B with corresponding planar portions 225, 227 between the respective ramps 224A, 224B and 228A, 228B. The ramps 224A, 224B and 228A, 228B are unitary with the lands 230, 232, 234. Channels 235A, 235B, which separately cover a portion the area between the 262A and 262B edges, are respectively banded by the ramps 224A, 224B, and 228A, 228B, and located in the embossments 270, 272. The coatings 280, 282, which may respectively be located in the channels 235A, 235B, are similarly structured as detailed above for the coating 88.

The two upper beads 226A, 226B and two lower beads 248A, 248B of the embodiment shown in FIG. 16 remain separated from each other in the corresponding metallic layers 212, 214, even below the land area 236 of the intermediate spacer layer 213, between the two combustion openings 218A, 218B. In general, the channels 235A, 235B cover more of the area between the edges 262A, 262B than the channel 115 covers the area between the edges 62A, 62B, as shown in FIG. 9.

In another embodiment (not shown), the two upper active beads 226A, 226B may have a similar location within the first layer 212 and have the same overall shape, but they may have curvilinear transitions respectively between the ramps 224A, 224B and 228A, 228B and the planar portions 225, 227. It is also permissible for the planar portions 225, 227 to be curvilinear.

In another embodiment, not shown, the two lower active beads 248A, 248B may have the same location within the second layer 214 and have the same overall shape, but they may have curvilinear transitions respectively between the ramps 250A, 252A and 250B, 252B and the planar portions of the beads 248B, 248B. It is also permissible for the planar portions of the beads 248A, 248B to be curvilinear.

Figure 5:
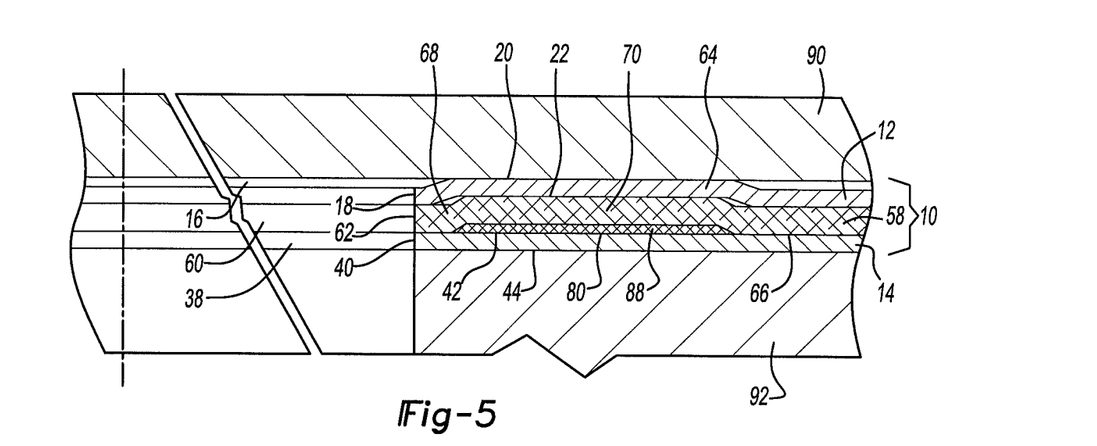
FIG. 5 is a partial cross-section side view of the present invention located between a cylinder head and a cylinder block.

A method to compress the active layers 12, 14 of the gasket 10 comprises providing the first unitary layer 12, the second unitary layer 14 and the unitary spacer layer 58, as described above. The coating 88 within the channel 80, being substantially incompressible and rigid, facilitates the compression of the first unitary layer bead 26 and the second unitary layer bead 48. More particularly, when the gasket 10 is located between a cylinder head 90 and a cylinder block 92 and compression is applied, the first layer bead 26 and the second layer, as shown in FIG. 5, bead 48 compress against the spacer layer 58. In the depicted embodiment, there are no structures or additional layers between the layers 12, 14 and the spacer layer 58 to limit this compression. The substantially incompressible coating 88 in the embossment 70 functions as a largely immovable foundation into which the layers 12, 14 can be compressed.

Additional structures, or layers, may be located without limitation between the layers 12, 14 and the spacer layer 58 if the sealing beads on any outer or intervening layer can be sufficiently compressed against the spacer layer 58.

In compression, the first layer lower surface 22 is located into direct contact with the spacer layer upper surface 64. Additionally, the second layer upper surface 42 is located into direct contact with the spacer layer lower surface 66. More particularly, the second layer upper surface 42 is located into contact with both the spacer layer lower surface 66 as well as the coating 88 in the embossment 70.

The method described hereabove may be applied to all embodiments of the present invention.

The above-described embodiments replace a shim layer with a spacer layer having an embossment with a coating disposed therein. For example, the coating may be rubber, or a synthetic rubber material, adapted for the cyclic high temperature and high pressure environment of a cylinder head gasket. The coating may also be a bronze powder encapsulated within an epoxy material (e.g., H11). Other materials robust enough to survive for prolong periods of time adjacent a combustion opening for an internal combustion engine may also be used.

Consequently, the structure of the gasket 10 results in reduced cost because a shim layer costs more than a spacer layer with an embossment(s) that may or may not have a coating material therein. Also, the gasket 10 simplifies the assembly of a head gasket by not using a mechanical locking method to attach the shim layer to the spacer layer, but instead the coating is printed into the embossments) via existing production processes. This results in gasket topography where the embossment(s) in the spacer layer can have a variable depth in order to create height topography at the combustion seal. This is a benefit over shim type designs where varying topography between bores is needed.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:
1. A gasket, comprising:
a first metallic layer having at least two adjacent combustion openings therein, wherein each opening is circumscribed by a combustion opening edge of said first layer, a first land extends radially from said edge, a single first active bead extends radially from said first land, said single first active bead comprising a first ramp, a first planar portion and a second ramp, and a second land extends radially from said first land, wherein said first land, said first active bead and said second land are unitary, and wherein there are no other beads in the first metallic layer;
a second metallic layer having at least two adjacent combustion openings therein, wherein each opening is circumscribed by a combustion opening edge of said second layer, a first land extends radially from said edge, a single first active bead extends radially from said first land, said single first active bead comprising a first ramp, a first planar portion and a second ramp, and a second land extends radially from said first land, wherein said first land, said first active bead and said second land are unitary, and wherein there are no other beads in the second metallic layer; and
a spacer layer located between said first and second layers and having at least two adjacent combustion openings therein, wherein each opening is circumscribed by a combustion opening edge of said spacer layer, a first land extends radially from said edge, an embossment extends radially from said first land and a second land extends radially from said embossment, said embossment defined by a first ramp, a planar portion and a second ramp, said spacer layer embossment extends beyond both said first metallic layer first active bead and said second metallic layer first active bead;
a channel in said spacer layer embossment extends radially outboard of both said first layer first active bead and said second layer first active bead; and
a coating selectively covering only said channel between said combustion openings;
wherein, at a time when compression is applied between a cylinder head and a cylinder block, only said single first metallic layer first active bead and said two lands of said first metallic layer are in full contact with a top of said spacer layer and said single second, metallic layer first active bead is in full contact with said coating.

2. The gasket of claim 1, wherein said first layer first land is axially aligned with said second layer first land, said first layer ramp is axially aligned with said second layer ramp, said first layer planar portion is axially aligned with said second layer planar portion and said first layer second ramp is axially aligned with said second layer second ramp.

3. The gasket of claim 1, wherein said channel in said spacer layer embossment is continuous and unitary with said embossment.

4. The gasket of claim 3, wherein said coating is a metal reinforced epoxy.

5. The gasket of claim 3, wherein portions of said channel have no coating.

6. The gasket of claim 1, wherein said channel is axially aligned with said embossment of said spacer layer.

7. The gasket of claim 1, wherein said first ramp and said second ramp of said spacer layer are both radially outboard of the first layer first active bead and said second layer first active bead.

8. The gasket of claim 1, wherein said first land, said embossment, said channel and said second land of said spacer layer are unitary with one another.

9. The gasket of claim 1, wherein said first layer has an upper surface and a lower surface parallel to said upper surface, said surfaces defining a constant thickness between them.

10. The gasket of claim 9, wherein said second layer has an upper surface and a lower surface parallel to said upper surface, said surfaces defining a constant thickness between them.

11. The gasket of claim 10, wherein said spacer layer has an upper surface and a lower surface parallel to said upper surface, said surfaces defining a constant thickness between them, exclusive of said coating.

12. The gasket of claim 11, wherein said first layer lower surface is in direct contact with said spacer layer upper surface and said spacer layer lower surface is in direct contact with said second layer upper surface.

13. A gasket, comprising:
an upper layer having a single annular bead radially located between two lands, said bead and lands being unitary with said upper layer, and wherein there are no other beads in the upper layer;
a lower layer having a single annular bead radially located between two lands, said bead and lands being unitary with said lower layer, and wherein there are no other beads in the lower layer;
a spacer layer located between said upper layer and said lower layer, said spacer layer having an annular embossment located between two lands, said embossment and said two lands being unitary with said spacer layer, said embossment having a channel formed on a lower surface of said spacer layer; and
a coating selectively covering only said channel and planar with the lower surface of said spacer layer;
wherein said upper layer bead and said lower layer bead are directly aligned respectively above and below said spacer layer embossment that extends beyond both said upper layer bead and said lower layer bead; and
wherein, at a time of full when compression is applied between a cylinder head and a cylinder block, only said single upper layer bead and said two lands is are in full contact with a top of said spacer layer and said single lower layer bead is in full contact with said coating.

14. The gasket of claim 13, wherein said coating is a bronze powder encapsulated in epoxy.

15. The gasket of claim 13, wherein said coating extends continuously in the radial direction from a first lower surface ramp of said spacer layer to a second lower surface ramp.

16. The gasket of claim 13, wherein said coating is selectively applied in said channel about a combustion opening in said spacer layer.

17. The gasket of claim 13, wherein said coating is applied in said channel between two adjacent combustion openings in said spacer layer.

18. A gasket, comprising:
a first metallic layer having a plurality of adjacent combustion openings therein, wherein each opening is circumscribed by a combustion opening edge of said first layer, a first land extends radially from said edge, a first active bead extends radially from said first land, said first active bead comprising a first ramp, a first planar portion and a second ramp, and a second land extends radially from said first land, wherein said first land, said first active bead and said second land are unitary, and wherein there are no other beads in the first metallic layer;
a second metallic layer having a plurality of adjacent combustion openings therein, wherein each opening is circumscribed by a combustion opening edge of said second layer, a first land extends radially from said edge, a first active bead extends radially from said first land, said first active bead comprising a first ramp, a first planar portion and a second ramp, and a second land extends radially from said first land, wherein said first land, said first active bead and said second land are unitary, and wherein there are no other beads in the second metallic layer; and a spacer layer located between said first and second layers and having a plurality of adjacent combustion openings therein, wherein each opening is circumscribed by a combustion opening edge of said spacer layer, a first land extends radially from said edge, a spacer layer embossment extends radially from said first land and a second land extends radially from said embossment, said spacer layer embossment defined by a first ramp, a planar portion and a second ramp, said spacer layer embossment extends beyond both said first metallic layer first active bead and said second metallic layer first active bead;

a channel in said spacer layer embossment extends radially outboard of both said first layer first active bead and said second layer first active bead; and a coating selectively covering only said channel in said spacer layer embossment, between said plurality of combustion openings;

wherein, at a time when compression is applied between a cylinder head and a cylinder block, only said single first metallic layer first active bead and said two lands of said first metallic layer are in full contact with a top of said spacer layer and said single second, metallic layer first active bead is in full contact with said coating.

* * * * *